(12) United States Patent
Chen et al.

(10) Patent No.: US 10,545,909 B2
(45) Date of Patent: Jan. 28, 2020

(54) COMPUTING SYSTEM MANAGEMENT USING SHARED MEMORY

(71) Applicant: Hewlett Packard Enterprise Development LP, Houston, TX (US)

(72) Inventors: Yuan Chen, Sunnyvale, CA (US); Daniel Juergen Gmach, Palo Alto, CA (US); Dejan S. Milojicic, Palo Alto, CA (US); Vanish Talwar, Campbell, CA (US); Zhikui Wang, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 245 days.

(21) Appl. No.: 15/305,405

(22) PCT Filed: Apr. 29, 2014

(86) PCT No.: PCT/US2014/035829
§ 371 (c)(1),
(2) Date: Oct. 20, 2016

(87) PCT Pub. No.: WO2015/167453
PCT Pub. Date: Nov. 5, 2015

(65) Prior Publication Data
US 2017/0046304 A1    Feb. 16, 2017

(51) Int. Cl.
*G06F 15/167*    (2006.01)
*H04L 29/08*    (2006.01)

(52) U.S. Cl.
CPC ........ *G06F 15/167* (2013.01); *H04L 67/1097* (2013.01)

(58) Field of Classification Search
CPC .............. H04L 67/109; H04L 67/1095; H04L 67/1097; G06F 3/0608; G06F 3/0631;
(Continued)

(56) References Cited

U.S. PATENT DOCUMENTS

| 5,634,004 A | 5/1997 | Gopinath et al. |
| 6,389,513 B1 | 5/2002 | Closson |

(Continued)

FOREIGN PATENT DOCUMENTS

JP    2010055175    3/2010

OTHER PUBLICATIONS

Dechamboux P. et al., "Using a Distributed Shared Memory for Implementing Efficient Information Mediators", (Research Paper), Retrieved Dec. 9, 2015, 5 Pages.
(Continued)

*Primary Examiner* — Farzana B Huq
(74) *Attorney, Agent, or Firm* — Trop, Pruner & Hu, P.C.

(57) ABSTRACT

A system management command is stored in a management partition of a global memory by a first node of a multi-node computing system. The global memory is shared by each node of the multi-node computing system. In response to an indication to access the management partition, the system management command is accessed from the management partition by a second node of the multi-node computing system. The system management command is executed by the second node. Executing the system management command includes managing the second node.

13 Claims, 5 Drawing Sheets

(58) Field of Classification Search
CPC .. G06F 3/0673; G06F 3/0656; G06F 39/5061; G06F 39/4881; G06F 39/544; G06F 13/1663
USPC ............... 709/239, 212–215, 221–224, 226; 711/122, 130, 148
See application file for complete search history.

(56) References Cited

U.S. PATENT DOCUMENTS

| | | | |
|---|---|---|---|
| 8,291,159 B2 | 10/2012 | Rajagopal et al. | |
| 8,375,174 B1* | 2/2013 | Cartmell | G06F 12/0692 711/147 |
| 2003/0115402 A1 | 6/2003 | Dahlgren et al. | |
| 2008/0177974 A1* | 7/2008 | Chiang | G06F 12/1036 711/173 |
| 2009/0198891 A1 | 8/2009 | Arimilli et al. | |
| 2011/0320558 A1 | 12/2011 | Gross et al. | |
| 2012/0215990 A1* | 8/2012 | Li | G06F 12/0806 711/147 |
| 2012/0233409 A1 | 9/2012 | Ross et al. | |
| 2012/0331239 A1 | 12/2012 | Pong | |
| 2013/0339981 A1 | 12/2013 | Ishibashi et al. | |
| 2014/0304354 A1* | 10/2014 | Chauhan | H04L 67/1097 709/213 |
| 2015/0006835 A1* | 1/2015 | Oberhofer | G06F 9/5077 711/162 |
| 2015/0186069 A1* | 7/2015 | Sharma | G06F 3/061 711/103 |

OTHER PUBLICATIONS

Delisle P. et al., "Multi-Colony Parallel Ant Colony Optimization on SMP and Multi-Core Computers", (Research Paper), Dec. 9-11, 2009, 2 Pages.

PCT Search Report/Written Opinion ~ Application No. PCT/US2014/035829 dated Jan. 30, 2015 ~ 12 pages.

Zhang F. et al., "Enabling In-Situ Execution of Coupled Scientific Workflow on Multi-Core Platform", (Research Paper), May 21-25, 2012, 2 Pages.

\* cited by examiner

COMPUTING SYSTEM MANAGEMENT USING SHARED MEMORY

BACKGROUND

Some computing systems include a group of nodes working together as a single system. Such systems may be referred to as "multi-node systems." Each node can be a computing device capable of functioning as an independent unit. The nodes may be interconnected to share data and/or resources. In addition, the nodes may communicate by passing messages to each other.

BRIEF DESCRIPTION OF THE DRAWINGS

Some implementations are described with respect to the following figures.

DETAILED DESCRIPTION

In a multi-node computing system, each node can be a computer including hardware resources such as processor(s), memory, storage, etc. Further, each node can include software resources such as an operating system, an application, a virtual machine, data, etc. In some implementations, a multi-node computing system may be a cluster that can be used as a single computing device. For example, a cluster may utilize clustering middleware to orchestrate the activities of each node (e.g., assigning tasks of a single application for execution on different nodes).

In accordance with some implementations, techniques or mechanisms are provided to allow for communication between nodes of a multi-node computing system using shared memory. Such communication can include passing of system management commands, thereby enabling one node to manage other nodes (referred to as "inter-node management"). The shared memory can also enable a node to access and analyze monitoring data generated by other nodes.

Figure 1A:
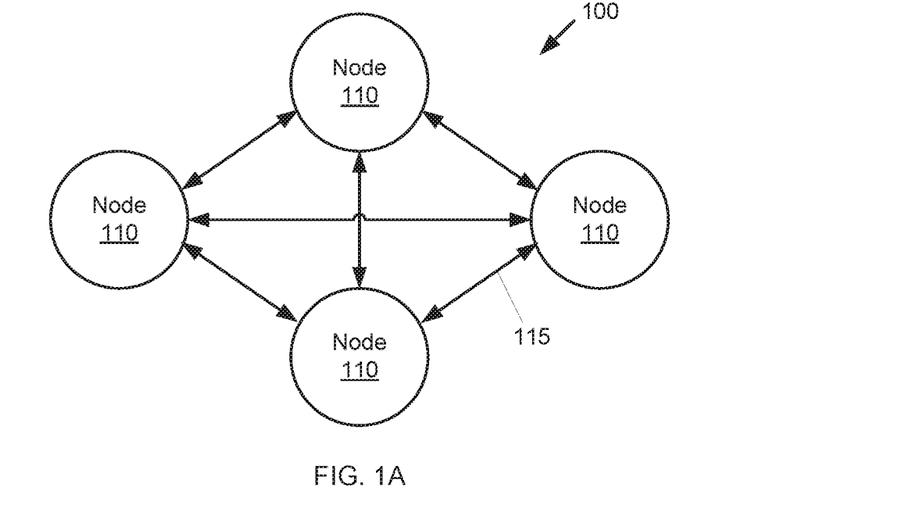
FIG. 1A is a schematic diagram of an example multi-node system, in accordance with some implementations.

FIG. 1A is a schematic diagram of an example multi-node system 100, in accordance with some implementations. As shown, the multi-node system 100 can include any number of computing nodes 110. The nodes 110 are coupled by a network 115 (e.g., a high-speed cluster interconnection or system fabrics). In some implementations, the nodes 110 may be configured for inter-node management and data monitoring. The configuration of the nodes 110 is described below with reference to FIG. 1B.

Figure 1B:
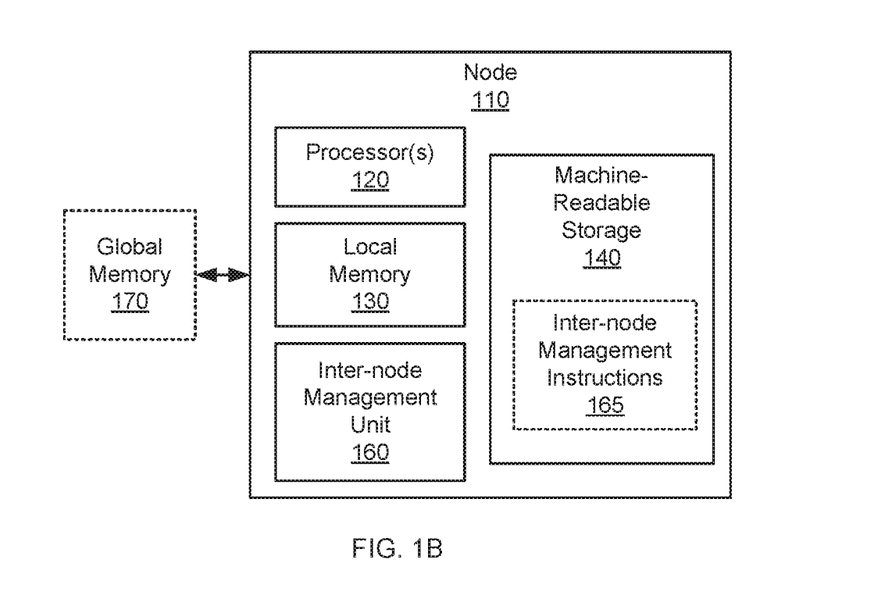
FIG. 1B is a schematic diagram of an example node, in accordance with some implementations.

As shown in FIG. 1B, a node 110 can include processor(s) 120, local memory 130, machine-readable storage 140, and an inter-node management unit 160. In some implementations, the inter-node management unit 160 can enable the node 110 to access a global memory 170 shared with other nodes. In some implementations, the global memory 170 can be non-volatile memory, and may not lose its state when powered off.

The processor(s) 120 can include a microprocessor, microcontroller, processor module or subsystem, programmable integrated circuit, programmable gate array, multiple processors, a microprocessor including multiple processing cores, or another control or computing device. The local memory 130 and the global memory 170 can be any type of computer memory (e.g., dynamic random access memory (DRAM), static random-access memory (SRAM), non-volatile memory (WM), a combination of DRAM and NVM, etc.). The machine-readable storage 140 can include non-transitory storage media such as hard drives, flash storage, optical disks, non-volatile memory, etc.

The global memory 170 can be obtained using memory sharing techniques such as cache-coherent shared memory, Remote Direct Memory Access (RDMA), and so forth. As shown, in some implementations, the global memory 170 may be shared memory that is external to the nodes 110. In other implementations, the global memory 170 may include some or all of the local memories 130 of all of the nodes 110, or may be some combination of external memory and local memory 130.

In some implementations, the inter-node management unit 160 can provide inter-node management using the global memory 170. Specifically, the inter-node management unit 160 may enable a node 110 to manage other nodes 110 by writing and/or reading system management commands in the global memory 170. The system management commands may be written to memory structures configured to store management information such as instruction code, function identifiers, function invocations, etc. Further, the system management commands can have a specific format. For example, one format of a system management command may include: a function identifier, the memory address of input parameters, the memory address of the destination data to store, and the function type to invoke.

In some implementations, the system management commands can provide system management of nodes. For example, the system management commands can control the power state of a node (e.g., shut down the node, turn on/off a processor or core of the node, adjust clock speed and/or voltage, etc). The system management commands can also cause a node to reboot, and/or specify an image of machine-readable instructions to be loaded on the node after reboot. Further, the system management commands can cause a node to enter/exit a management mode (i.e., for managing other nodes), and specify an image of machine-readable instructions to be executed on the node during the management mode. In addition, the system management commands can control the monitoring state of a node (e.g., begin or end monitoring a specific node, a group of nodes, any nodes having a specific status, a specific application running on a node, etc.), and/or cause the node to analyze monitoring data of some or all nodes.

In some implementations, the inter-node management unit 160 of each node may send an indication to other nodes to check the global memory 170 for new system management commands. For example, the indication may be an inter-node signal such as an interrupt, a message, etc. In other implementations, the inter-node management unit 160 of each node may check the global memory 170 in response to a time-based indication e.g., expiration/restart of a repeating cycle, a scheduled event, a periodic polling, etc.).

In some implementations, the inter-node management unit 160 may share monitoring data with other nodes by storing the monitoring data in the global memory 170. Examples of monitoring data may include error logs, performance metrics, and operation states. The stored monitoring data may be organized as key-value pairs. The key for the monitoring data can be mapped to a memory address via hash function or table. The inter-node management unit 160 of another node can then access the monitoring data via key mapping and memory access. In some implementations, the monitoring data can be opportunistically stored in a location that is physically local or close to the node that generates or consumes the monitoring data. Further, the monitoring data can be cached, replicated and/or synchronized across nodes.

The inter-node management unit 160 may also enable analysis of monitoring data stored in the global memory 170. For example, the inter-node management unit 160 may collect and analyze monitoring data locally, and then copy only the analysis results to global memory 170. In some implementations, a ring buffer can be implemented in a distributed memory manner, and can be utilized to store last N instances of collected monitoring data. Thus, in the event of a need to search the distributed memory ring buffers, such search can be performed by searching individual ring buffers in a distributed manner, and then storing the end result in the requesting node's memory. Further, the inter-node management unit 160 can utilize probabilistic graphical models such as Bayesian networks to capture correlations and dependencies among the collected monitoring data.

In some implementations, the inter-node management unit 160 includes an Application Programming Interface (API) for external system management systems (e.g., in-band management services, deployment services, out-of-band management services, etc. This API can enable an external system management system to manage nodes using system management commands written to the global memory 170. Further, the API can enable the external system management system to access the monitoring data of the nodes.

Various tasks of the inter-node management unit 160 are discussed further below with reference to FIGS. 2, 3A-3C, 4, and 5. Note that any of the features described herein in relation to the inter-node management unit 160 can be implemented in any suitable manner. For example, any of these features can be hard-coded as circuitry in the inter-node management unit 160. In other examples, the machine-readable storage 140 can include inter-node management instructions 165 that can be loaded and executed by the processor(s) 120 and/or the inter-node management unit 160 to implement the features of the inter-node management unit 160 described herein. In further examples, all or a portion of the machine-readable storage 140 can be embedded within the inter-node management unit 160. In still further examples, the inter-node management instructions 165 can be stored in an embedded storage medium of the inter-node management unit 160, while other information is stored in the machine-readable storage 140 that is external to the inter-node management unit 160. In yet further example, the inter-node management instructions 165 can be stored in the global memory 170.

Figure 2:
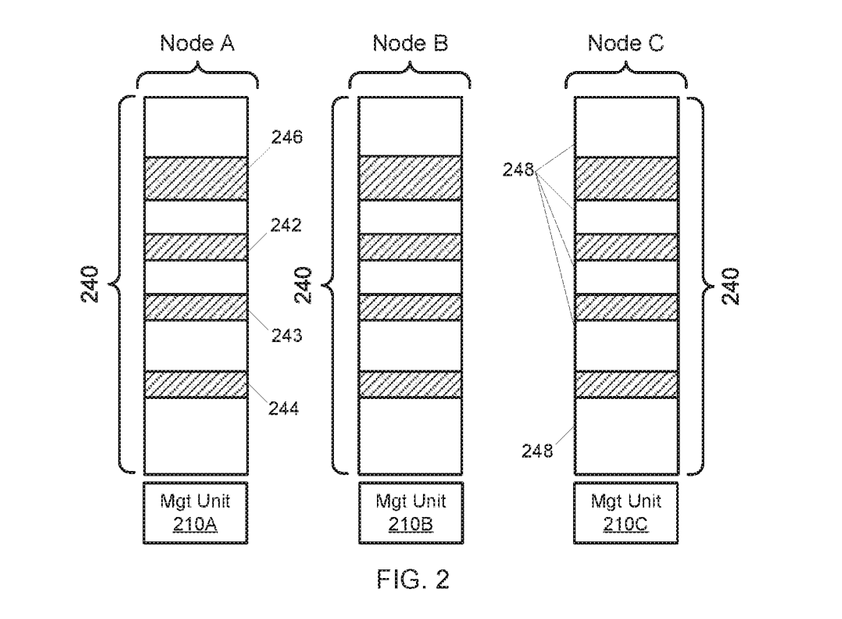
FIG. 2 is an illustration of shared memory mapping according to an example implementation.

Referring to FIG. 2, shown is an illustration of shared memory mapping according to an example implementation. Specifically. FIG. 2 corresponds to an example multi-node system including three nodes, namely Node A, Node B, and Node C. As shown, each node may be associated with a management unit 210. The management unit 210 may correspond generally to the inter-node management unit 160 shown in FIG. 1B. Further, the Nodes A, B, and C may share the global address space 240. The global address space 240 may be a virtual address space for a global memory shared by Nodes A, B, and C. For example, the global address space 240 may correspond to a global memory that is external to nodes, to a global memory including some or all of the local memories of the nodes, to a combination of external and local memories, and so forth.

In some implementations, the global address space 240 can include memory partitions reserved for inter-node management or data monitoring, which may be referred to as "management partitions." For example, as shown in FIG. 2, the global address space 240 includes the management partitions 242, 243, 244, and 246, which can be accessed by the Nodes A, B, and C.

In some implementations, any of the management partitions can be used to manage any or all of the nodes. In other implementations, some management partitions may be reserved for managing a particular node or group of nodes. For example, referring to FIG. 2, the management partition 246 may be reserved for managing Node C. In some implementations, the association between a management partition and a node may be established by firmware associated with a bootstrap process.

In some implementations, the remaining portions 248 of the global address space 240 that are not used as management partitions can be used as functional memory of the multi-node system 100. For example, each functional memory portion 248 can be used to store variable values, program instructions, static data, etc.

In some implementations, each management partition may be specified as a virtual or physical address range of addresses). Further, each management partition can be associated with security permissions assigned to the inter-node management units 160, thereby reserving the management partition for inter-node management or data monitoring purposes.

Figure 3A:
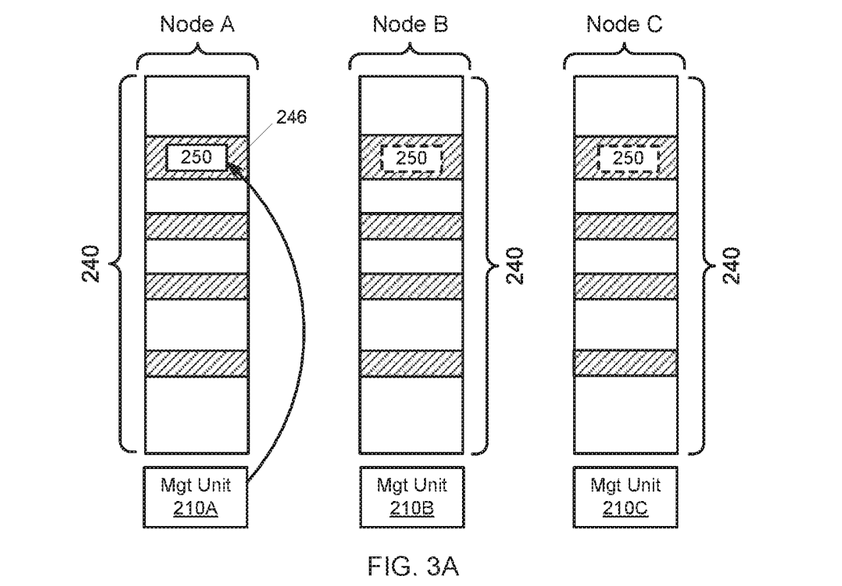
FIGS. 3A-3C are illustrations of an internode management operation according to an example implementation.
Figure 3B:
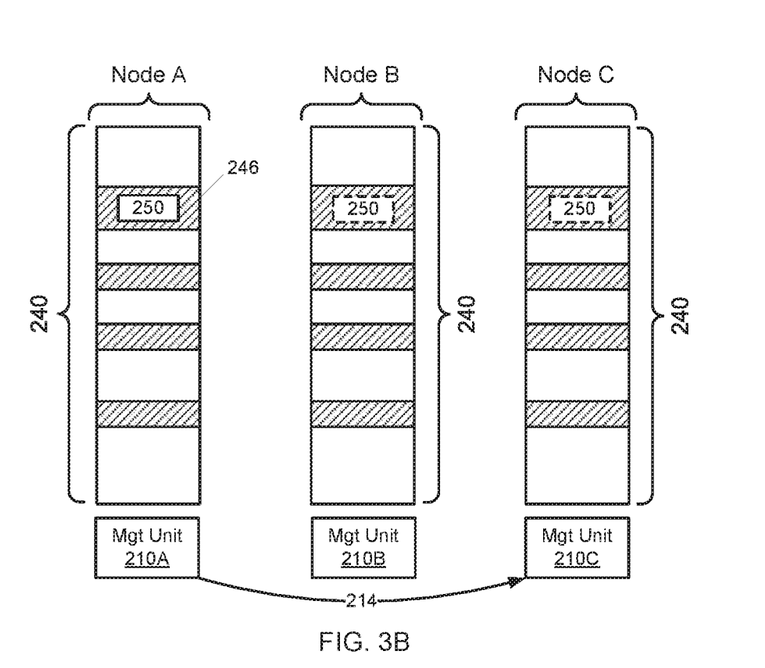
Figure 3C:
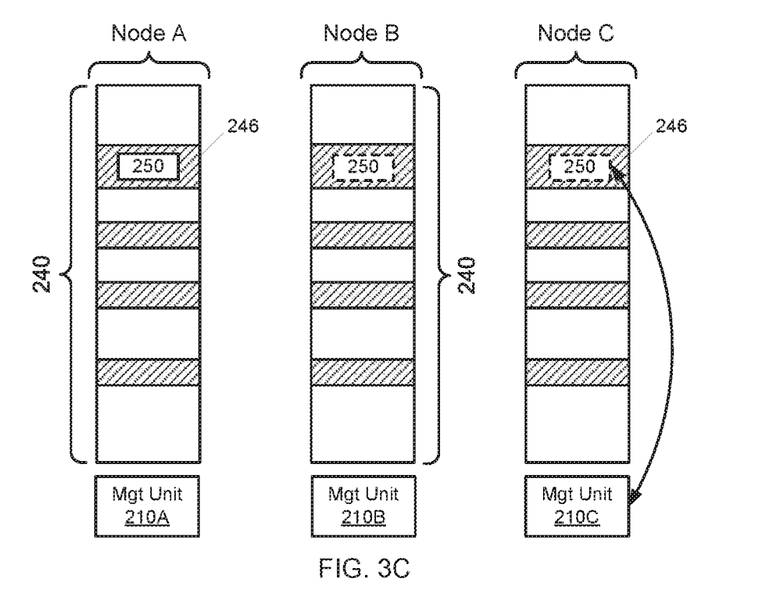

FIGS. 3A-3C are illustrations of an example internode management operation according to some implementations. Specifically, FIGS. 3A-3C illustrate three states or stages of an example internode management operation using the shared memory mapping illustrated in FIG. 2. Assume that, in this example, Node A is a manager node of the multi-node system including Node A, Node B, and Node C. Assume further that Node A determines that Node C should be rebooted, and thus initiates an internode management operation to reboot Node C. Assume also that the management partition 246 is associated with Node C (e.g., is reserved for managing Node C).

Referring now to FIG. 3A, the management unit 210A of Node A can initiate the internode management operation by writing a system management command 250 into the management partition 246 associated with Node C. In this example, the system management command 250 is a reboot instruction.

Referring now to FIG. 3B, the management unit 210A of Node A can send a signal 214 to the management unit 210C of Node C to check the management partition 246 associated with Node C. In some implementations, the signal 214 can be an inter-node signal such as an interrupt, a message, etc.

Referring now to FIG. 3C, in response to the signal 214, the management unit 210C of Node C can check the management partition 246. Further, the management unit 210C can access the system management command 250 stored in the management partition 246. The system management command 250 can then be executed by Node C, thereby causing Node C to be rebooted.

Note that, while FIG. 3B shows the management unit 210A sending the signal 214 to cause the management unit 210C to check the management partition 246, other implementations are possible. For example, in some implementations, each management unit 210 can automatically check a management partition according to a predefined period or schedule, in response to an event, etc.

Note also that, while FIGS. 3A-3C show an example in which one node controls another node, other implementations are possible. For example, in some implementations, all nodes (or a subset of nodes) can be signaled to check a particular management partition storing a system management command. In this manner, a manager node can broadcast a command to a group of nodes. Further, in some implementations, the nodes can be divided into hierarchical levels, with nodes on a first level having control over nodes on a second level. The nodes can thus be arranged in hierarchical trees, thereby enabling varying degrees of control within the multi-node system.

In some implementations, the nodes may use a management partition to communicate both a request and a response. For example, assume that, after reading the system management command 250 from the management partition 246, the management unit 210C writes a command acknowledgement (not shown) into the management partition 246. In another example (not shown), a first node may write a request into a management partition for a second node to provide data, and the second node may write the requested data into the same management partition for access by the first node.

Figure 4:
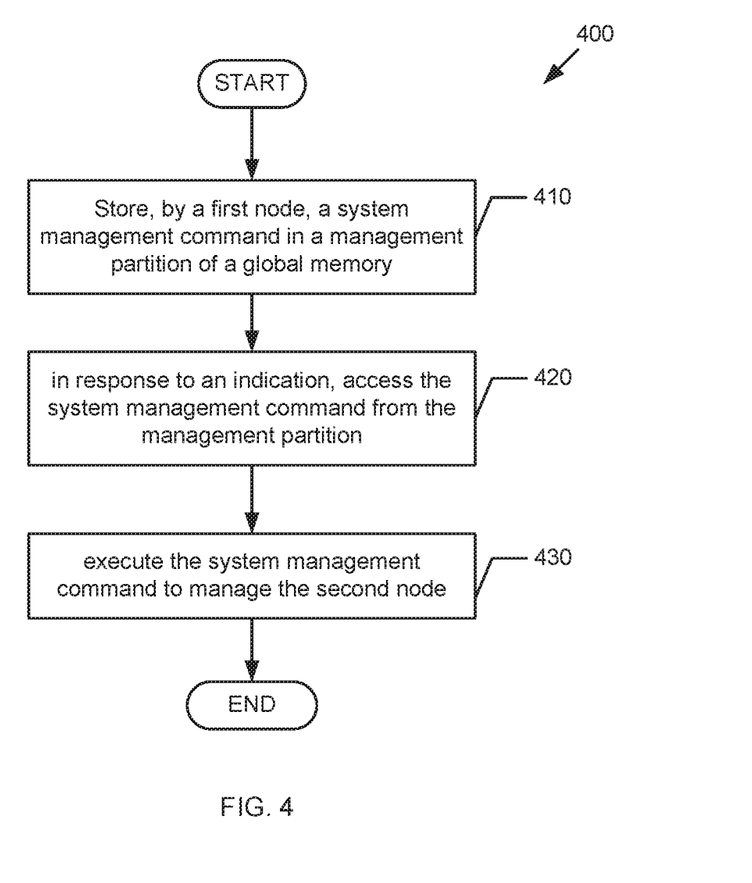
FIG. 4 is a flow diagram of a process according to some implementations.

Referring now to FIG. 4, shown is a process 400 for internode management in accordance with some implementations. The process 400 may be performed by the processor(s) 120 shown in FIG. 1B, the inter-node management unit 160 shown in FIG. 1B, and/or the management units 210 shown in FIGS. 2 and 3A-3C. The process 400 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 400 may be described below with reference to FIGS. 1A-1B, 2, and 3A-3C, which show examples in accordance with some implementations. However, other implementations are also possible.

At 410, a first node of a multi-node system may store a system management command in a management partition of a global memory. The global memory can be shared by each node of a multi-node computing system. For example, referring to FIG. 3A, the management unit 210A of Node A writes the system management command 250 to the management partition 246.

At 420, in response to an indication to check the management partition, a second node can access the system management command from the management partition. For example, referring to FIG. 3B, the management unit 210C of Node C can access the system management command 250 stored in the management partition 246. In some implementations, the management unit 210C can check the management partition 246 in response to receiving the signal 214 from Node A. Alternatively, in other implementations, the management unit 210C can check the management partition 246 periodically or according to a schedule, in response to an event, etc.

At 430, the system management command can be executed to manage the second node. For example, referring to FIG. 3C, Node C can execute the system management command 250 stored in the management partition 246. In some implementations, the system management command can control the power state of the second node, a management mode of the second node, a monitoring state of the second node, etc. After 430, the process 400 is completed.

Figure 5:
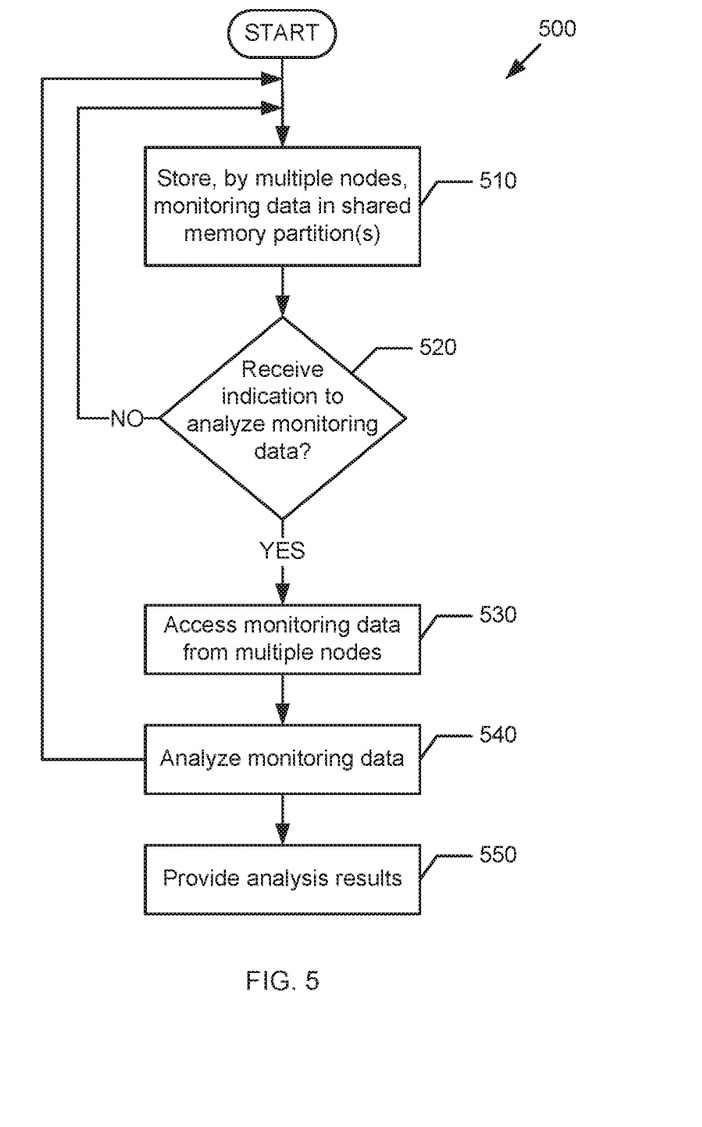
FIG. 5 is a flow diagram of a process according to some implementations.

Referring now to FIG. 5, shown is a process 500 for internode management and data monitoring in accordance with some implementations. The process 500 may be performed by the processor(s) 120 shown in FIG. 1B, the inter-node management unit 160 shown in FIG. 1B, and/or the management units 210 shown in FIGS. 2 and 3A-3C. The process 500 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 500 may be described below with reference to FIGS. 1A-1B, 2, and 3A-3C, which show examples in accordance with some implementations. However, other implementations are also possible.

At 510, multiple nodes of a multi-node system may store monitoring data in shared memory partitions(s), For example, referring to FIG. 2, the management unit 210A of Node A can write monitoring data to management partition 242, the management unit 210B of Node B can write monitoring data to management partition 244, and the management unit 210C of Node C can write monitoring data to management partition 246. In some implementations, the monitoring data can be organized as key-value pairs, and the key can be mapped to a memory address via hash function or table.

At 520, a determination is made at each node about whether an indication to analyze monitoring data has been received. For example, referring to FIG. 3A, the management unit 210C can determine whether a system management command accessed from the management partition 246 includes analyzing monitoring data from Node A, Node B, and Node C. In other examples, the management unit 210C can determine whether a policy is triggered by a period, a schedule, and/or an event.

If it is determined at 520 that an indication to analyze monitoring data has not been received by a particular node, then the process 500 can repeat at 510. However, if it is determined at 520 that an indication to analyze monitoring data has been received by the particular node, then at 530, the particular node can access the monitoring data of multiple nodes. In some implementations, the monitoring data of each node can be accessed from a management partition associated with each node. For example, referring to FIG. 2, the management unit 210C of Node C can access management partition 242 to obtain monitoring data associated with Node A, and can access management partition 244 to obtain monitoring data associated with Node B.

At 540, the particular node can analyze the monitoring data of the multiple nodes. At 550, the particular node can provide the results of the analysis of the monitoring data. For example, referring to FIG. 2, the management unit 210C and/or Node C can analyze monitoring data associated with Node A, Node B, and Node C, and can then provide analysis results including all of these nodes. In some implementations, the analysis results can be shared by storing them in the global memory. After 550, the process 500 can repeat at 510.

Note that, while FIG. 5 shows an example in which each node stores monitoring data in an associated management partition, other implementations are possible. For example, in some implementations, all nodes (or a subset of nodes) can store monitoring data in one management partition (or a group of management partitions).

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; non-volatile memory (NVM), magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
    storing, by a first node of a multi-node computing system, a system management command in a management partition of a global memory associated with a second node of the multi-node computing system, wherein the global memory is shared by each node of the multi-node computing system;
    storing a second system management command in a second shared memory partition, wherein the second shared memory partition is associated with a third computing node of the plurality of computing nodes, and wherein the second system management command is to manage the third computing node;
    identifying, by the second node of the multi-node computing system, an indication to access the management partition associated with the second node of the multi-node computing system, the indication being one selected from a time based indication and an inter-node signal;
    in response to the identified indication, accessing, by the second node of the multi-node computing system, the system management command from the management partition; and
    executing, by the second node of multi-node system, the system management command accessed from the management partition, wherein executing the system management command comprises managing the second node,
    wherein the first node of the multi-node computing system is configured to manage the second node of the multi-node computing system.

2. The method of claim 1, wherein executing the system management command comprises managing at least one selected from a power state of the second node, a monitoring state of the second node, and a management mode of the second node.

3. The method of claim 1, wherein the management partition is reserved for inter-node management of the multi-node computing system.

4. The method of claim 1, further comprising:
    storing, by each node of the multi-node computing system, monitoring data in a plurality of management partitions included in the global memory.

5. The method of claim 4, further comprising:
    retrieving, by the first node, the monitoring data from the plurality of management partitions; and
    analyzing the retrieved monitoring data to obtain combined results.

6. The method of claim 1, further comprising:
    storing, by the second node of multi-node system, a response to the system management command into the management partition.

7. A system, comprising:
    a plurality of computing nodes, each computing node comprising:
        at least one processor;
        a local memory; and
        an inter-node management unit to:
            determine whether a system management command is stored in a management partition associated with a first computing node of the inter-node management unit of a global memory shared by the plurality of computing nodes, wherein the system management command is generated by a second computing node; and
            in response to a determination that the system management command is stored in the management partition associated with the first computing node of the inter-node management unit of the global memory, execute the system management command to manage the first computing node,
        wherein the second computing node is configured to manage the first computing node, and
        wherein a second system management command is stored in a second shared memory partition, wherein the second shared memory partition is associated with a third computing node of the plurality of computing nodes, and wherein the second system management command is to manage the third computing node.

8. The system of claim 7, the inter-node management unit further to:
    during an initiation of the first computing node, map the management partition to a portion of the global memory.

9. The system of claim 7, the inter-node management unit further to:
    analyze monitoring data from a plurality of management partitions.

10. The system of claim 9, wherein the monitoring data is organized in key-value pairs.

11. The system of claim 9, each computing node of the plurality of computing nodes further comprising a ring buffer to store the last N instances of the monitoring data.

12. The system of claim 7, wherein the inter-node management unit is to determine whether the system management command is stored in the management partition in response to a signal from the second computing node.

13. An article comprising at least one non-transitory machine-readable storage medium storing instructions that upon execution cause a first computing node to:
- receive an indication to access a shared memory partition associated with the first computing node, wherein the first computing node is one of a plurality of computing nodes included in a cluster, wherein the shared memory partition is included in a global memory, the indication being one selected from a time based indication and an inter-node signal;
- store a second system management command in a second shared memory partition, wherein the second shared memory partition is associated with a third computing node of the plurality of computing nodes, and wherein the second system management command is to manage the third computing node;
- in response to the receive indication, access a system management command from the shared memory partition, wherein the system management command is generated by a second computing node of the plurality of computing nodes; and
- in response to a determination that the system management command is stored in the shared memory partition, execute the system management command to manage the first computing node,
- wherein the second computing node is configured to manage the first computing node.

* * * * *